US011619243B2

(12) United States Patent
Hägele et al.

(10) Patent No.: US 11,619,243 B2
(45) Date of Patent: Apr. 4, 2023

(54) MEDICAL, IN PARTICULAR DENTAL-MEDICAL, FAN

(71) Applicant: Dürr Dental SE, Bietigheim-Bissingen (DE)

(72) Inventors: Andreas Hägele, Weinstadt (DE); Thomas Wohlbold, Lehrensteinsfeld (DE)

(73) Assignee: DÜRR DENTAL SE, Bietigheim-Bissingen (DE)

( * ) Notice: Subject to any disclaimer, the term of this patent is extended or adjusted under 35 U.S.C. 154(b) by 0 days.

(21) Appl. No.: 17/362,787

(22) Filed: Jun. 29, 2021

(65) Prior Publication Data
US 2021/0404484 A1 Dec. 30, 2021

(30) Foreign Application Priority Data

Jun. 29, 2020 (EP) .................................... 20182847

(51) Int. Cl.
*F04D 29/66* (2006.01)
*A61C 19/00* (2006.01)
*F04D 29/42* (2006.01)
*F04D 29/58* (2006.01)

(52) U.S. Cl.
CPC .......... *F04D 29/664* (2013.01); *A61C 19/007* (2013.01); *F04D 29/4226* (2013.01); *F04D 29/5826* (2013.01)

(58) Field of Classification Search
CPC ............... F04D 29/664; F04D 29/4226; F04D 29/5826; A61C 19/007; A61C 17/06
See application file for complete search history.

(56) References Cited

U.S. PATENT DOCUMENTS

| 2008/0196971 A1* | 8/2008 | Charbonnier ........ G10K 11/168 181/290 |
| 2010/0003466 A1* | 1/2010 | Hessler ................ G10K 11/162 427/389.9 |
| 2010/0183433 A1* | 7/2010 | Sinzaki ................. F04D 29/422 415/204 |
| 2014/0202577 A1 | 7/2014 | Webster, III |
| 2014/0332313 A1* | 11/2014 | Bischoff ............... B32B 27/065 181/290 |

(Continued)

FOREIGN PATENT DOCUMENTS

| CN | 106 961 185 A | 7/2017 |
| DE | 28 04 653 | 8/1979 |

(Continued)

OTHER PUBLICATIONS

DE-102011014359-A1 Translation (Year: 2012).*
Search Report dated Nov. 27, 2020 issued in corresponding European Application No. 20182847.

*Primary Examiner* — Courtney D Heinle
*Assistant Examiner* — Ryan C Clark
(74) *Attorney, Agent, or Firm* — Chiesa, Shaninian & Giantomasi PC

(57) ABSTRACT

A medical, in particular dental-medical, fan for extracting or compressing a gaseous working fluid, in particular air, comprises a compressor unit with an outer housing, which comprises an inlet opening for the working fluid and an outlet opening for the working fluid, which are fluidically connected to one another, and which defines a compressor sector and a drive sector.

16 Claims, 4 Drawing Sheets

(56) References Cited

U.S. PATENT DOCUMENTS

| | | | | |
|---|---|---|---|---|
| 2015/0027561 A1* | 1/2015 | Mauthe | .................. | F04D 29/40 |
| | | | | 137/377 |
| 2016/0207283 A1* | 7/2016 | Wang | ...................... | B32B 27/32 |
| 2017/0221467 A1* | 8/2017 | Vidovic | ................ | B32B 15/046 |
| 2018/0044925 A1* | 2/2018 | Koh | ........................ | B32B 9/002 |
| 2019/0162187 A1* | 5/2019 | Cappuzzo | ............... | F04C 18/32 |

FOREIGN PATENT DOCUMENTS

| | | | | |
|---|---|---|---|---|
| DE | 10 2010 023462 A1 | | 12/2011 | |
| DE | 102010023462 A1 | * | 12/2011 | ........... F04D 17/122 |
| DE | 102011014359 A1 | * | 9/2012 | ............. A61C 17/04 |
| DE | 10 2012 101642 A1 | | 8/2013 | |
| EP | 2 686 559 B1 | | 11/2019 | |
| WO | WO-2016177960 A1 | * | 11/2016 | ............. B29C 70/46 |

* cited by examiner

MEDICAL, IN PARTICULAR DENTAL-MEDICAL, FAN

BACKGROUND OF THE INVENTION

1. Field of the Invention

The invention relates to a medical, in particular dental-medical, fan for extracting or compressing a gaseous working fluid, in particular air, with a) a compressor unit with an outer housing, which comprises an inlet opening for the working fluid and an outlet opening for the working fluid, which are fluidically connected to one another, and which defines a compressor sector and a drive sector;
b) a fan unit with a radial impeller in a spiral housing, which is kept in the compressor sector and by which working fluid can be fed from the inlet opening to the outlet opening, wherein the axis of rotation of the radial impeller defines the longitudinal axis and an axial direction of the compressor unit;
c) an electric motor, in particular an electronically commutated electric motor, which is kept in the drive sector and by which the radial impeller can be driven;
d) a soundproofing absorption system.

2. Description of the Prior Art

Such fans are known from the market and, depending on how they are externally connected up, can be used as suction machines or compressors.

In particular in the dental sector, it is desirable for such fans to have a high level of efficiency, by which a high fan capacity is ensured at the same time as favorable energy consumption. In a dental surgery, in which the fan is used for extracting liquids and solids that occur at the place of treatment, the fan is often kept near the areas that are used by staff and patients. Therefore, moderate noise generation is particularly desirable there. In addition, it is always the aim that the fan is compact and has the smallest possible dimensions, in order that it can be kept well at a place of treatment and possibly can also be handled in a mobile manner.

With regard to noise generation, in EP 2 686 559 B1 sound absorption is provided by using a liquid which radially surrounds on the one hand a spiral housing with a radial impeller and on the other hand an electric motor, in each case in a chamber. This is adjoined in the radial direction by an outer housing or the housing wall thereof.

Although it was recognized there that a liquid could be used for sound absorption, the fan of such a design still has relatively large dimensions and is still found in practice to produce a relatively great noise during operation.

SUMMARY OF THE INVENTION

The object of the invention is therefore to provide a fan of the type mentioned at the beginning with which effective sound damping is provided together with a compact device.

This object is achieved in the case of a fan of the type mentioned at the beginning by providing that e) the soundproofing absorption system in the compressor sector defines a first and a second compressor absorption space, which at least partially surround the spiral housing in the radial direction, wherein, in the radial direction, in the first compressor absorption space there is a first liquid volume of a first liquid and in the second compressor absorption space there is a solid absorber;
f) the soundproofing absorption system in the drive sector defines a first and a second drive absorption space, which at least partially surround the electric motor in the radial direction, wherein, in the radial direction, in the first drive absorption space there is a second liquid volume of a second liquid and in the second drive absorption space there is a solid absorbing layer.

According to the invention, it has been recognized that a combination of a liquid system and a solid system for soundproofing can achieve such effective soundproofing that the fan has low noise generation in comparison with customary fans and what is more can also be formed extremely compactly in relation to customary fans. This is of great advantage in particular because, if the dimensions of the fan are be reduced, electric motors that rotate at even higher speeds, with correspondingly high noise generation in a higher frequency range, are necessary in order to obtain a suction capacity of the fan that is still adequate.

It is particularly effective for soundproofing if
a) the first compressor absorption space is a radial space that directly adjoins the spiral housing;
and/or
b) the first drive absorption space is an annular space that directly adjoins the electric motor.

Good soundproofing can already be achieved if the first liquid and/or the second liquid is water. The soundproofing can possibly be further improved if the first liquid and/or the second liquid is a silicone, an oil, a glycol or a glycol mixture.

With respect to the solid system, it is favorable if the absorber and/or the absorbing layer is at least partially formed from a foam material.

It is in this case of advantage, and can further improve the soundproofing, if the absorber and/or the absorbing layer is formed from a number of layers following one another in the radial direction that are separate from one another or are formed entirely or partially as a composite layer in which the layers are bonded to one another, in particular adhesively bonded to one another;
wherein
a) at least one layer is produced from a foam material and at least one layer is produced from a bitumen heavy foil;
and/or
b) layers following one another in the radial direction, which are alternately formed from a foam material and a bitumen heavy foil, are provided;
and/or
c) four layers following one another in the radial direction are provided;
and/or
d) the radially innermost layer is formed from a bitumen heavy foil.

It is advantageous if the soundproofing system also
a) comprises in the second compressor absorption space a solid absorbing block which, in the axial direction, is arranged between the first compressor absorption space and the outer housing;
and/or
b) comprises in the second drive absorption space a solid absorbing block which, in the axial direction, is arranged between the first drive absorption space and the outer housing.

In this way, the soundproofing is also increased in the axial direction.

It is also favorable if a) the outer housing also defines a discharge sector, arranged in which is a discharge channel, which is connected to a flow output of the spiral housing and leads to the outlet opening of the compressor unit;
b) the soundproofing absorption system in the discharge sector defines a discharge absorption space, which at least partially surrounds the discharge channel and in which there is a solid sound damper volume.

In this way, the discharge sound due to the flow of the working fluid from its inlet opening to its outlet opening can also be largely damped, which contributes altogether to the soundproofing.

It is also of advantage in this connection if a flow path for the working fluid is formed from the spiral housing to the outlet opening of the compressor unit, wherein this flow path comprises one or more deflecting points at which the direction of flow of the exhaust air is deflected, in particular by an angle of 90°. In this way, a flow path that is as long as possible, by way of which the working fluid is discharged from the compressor unit, can be formed along with a base area that is as small as possible.

Since fluidically a pressure loss occurs at deflecting points, it is favorable if there is at least before a deflecting point a pressure compensating portion with a constriction, which defines in the direction of flow a narrowed or narrowing cross section and then again a widening cross section.

It is particularly effective in this case if the cross section of the flow path in a pressure compensating portion widens from the constriction to the re-widened cross section by a factor of between 1.1 and 1.3, preferably by a factor of approximately 1.24 or approximately 1.3.

In order also to reduce the transmission of structure-borne sound, it is favorable if the soundproofing absorption system comprises a bearing structure by means of which the electric motor and/or the spiral housing is mounted in a floating manner with respect to the outer housing.

Particularly effectively, the bearing structure may comprise for this the solid absorber and/or the solid absorbing layer and/or one or both of the solid absorbing blocks according to Claim 6.

Since the small dimensions that are then possible, with at the same time moderate noise generation, can cause the waste heat of the fan to increase, effective cooling is necessary to ensure the operational reliability of the fan. For this purpose, it is of additional advantage if the fan comprises a cooling system, for which
a) the first drive absorption space is formed as a through-flow space and the first compressor absorption space is formed as a closed space;
or
the first drive absorption space is formed as a closed space and the first compressor absorption space is formed as a through-flow space;
or the first drive absorption space and the first compressor absorption space are formed as a through-flow space;
b) the through-flow space is connected to an inflow connection and an outflow connection, which for their part are connected to an inflow line and an outflow line to a cooling circuit, in which the liquid flowing through the through-flow space provides a cooling liquid.

In this way, at least the liquid in a through-flow space is used both for soundproofing and for cooling. If the first drive absorption space and the first compressor absorption space are formed as a through-flow space, they may be spatially separated and respectively connected to corresponding connections. It is alternatively also possible that only one of the absorption spaces is connected to an inflow connection and an outflow connection, wherein the two absorption spaces are then fluidically connected to one another.

The compact type of construction that is made possible means that it is advantageously possible that the fan comprises a coolant supply unit with a coolant container for the cooling liquid carried in the cooling circuit and a pump. In this way, the fan can possibly be used as a mobile fan, without this depending on an external coolant source.

Preferably, the first compressor absorption space and the first drive absorption space are separated from one another by an intermediate wall, which is formed as a heat conductor, and for this in particular from aluminum. In this way, heat can be transferred from the first liquid in the first compressor absorption space to the second liquid in the drive absorption space or vice versa.

In order also to additionally assist the cooling of the compressor unit, it is particularly effective if the inlet opening is connected to an intake line and that the cooling system comprises a heat exchanger which is connected to the intake line and the outflow line of the cooling circuit in such a way that the heat exchanger is flowed through by the working fluid and the cooling liquid in such a way that heat is transferred from the cooling liquid to the working fluid and the cooling liquid is cooled. In this way, the intake air is used for cooling the cooling circuit.

In the case of fans with comparable capacity that are known on the market, the working fluid—in the case of the dental fans this is the intake air in the form of spray mists or aerosols, is taken in at room temperature. The compression causes heating to such an extent that the temperature of the exhaust air is relatively high and, depending on the configuration of the fan, the load may be between 80° C. and 100° C. Inside the fan there is already such a high temperature that for example the bearings of the rotor are stressed and, as a result, have a reduced service life. Higher exhaust-air temperatures also however adversely affect the subsequent installation of the exhaust-air lines.

In the case of the present invention, it has been recognized that it is nevertheless possible to use the intake air for cooling the cooling circuit or as a result to discharge the heat given off by the fan by way of the exhaust-air line without inadmissibly increasing the temperature of the exhaust air. To do so, the fan does not have to be externally cooled by any more complex measures; for example, it is possible to dispense with external fans, convection measures, heat-dissipating connections or surfaces or the like. This contributes in an assisting manner to the possibility referred to above that, while generating little noise in comparison with customary fans, the fan can also still be formed extremely compactly.

The interaction of some or all of the measures described above also in particular produces the synergistic effect that the working fluid is heated on the flow path through the fan to such a small extent that the temperature of the exhaust air is below a critical threshold value, so that an increase in the temperature of the exhaust air is still possible without the components that are flowed onto or over being undesirably stressed or damaged.

In the dental sector in particular, it may happen that the intake path to the fan becomes blocked, for example if a dental suction cannula is clogged by tissue or particles of solid matter. For such cases, it is favorable if the inlet opening is connected to an intake line and a safety device is provided, by which partial or complete blocking of the intake line can be detected and, in the event of blocking of the intake line, provides an auxiliary gas, which flows to the inlet opening of the compressor unit instead of the working fluid.

In this case, the safety device preferably comprises a valve in an auxiliary gas line, which opens out into the intake line, wherein the safety device is designed in such a way that the valve closes in a basic configuration and opens dependent on one or more parameters, in particular dependent on the pressure, the temperature and/or the volumetric flow, in the intake line.

BRIEF DESCRIPTION OF THE DRAWINGS

Exemplary embodiments of the invention are explained in more detail below on the basis of the drawings, in which.

DESCRIPTION OF PREFERRED EXEMPLARY EMBODIMENTS

Figure 1:
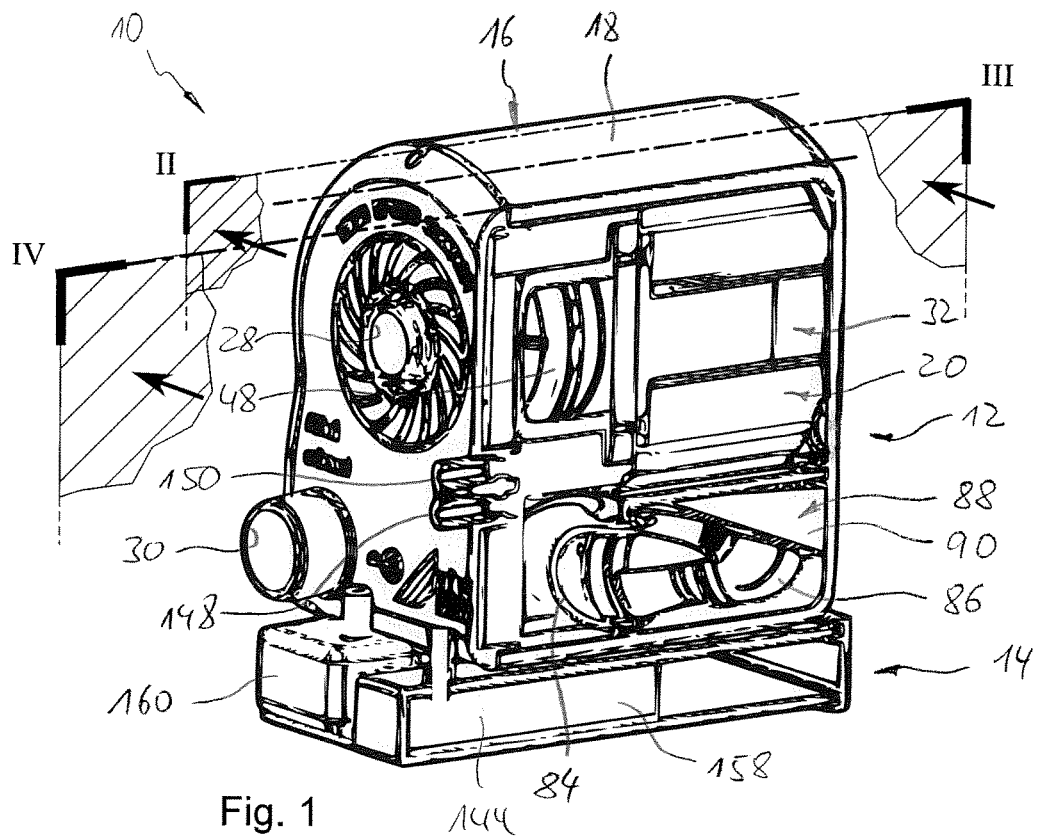
FIG. 1 shows a perspective view of a dental fan in vertical section, with a compressor unit that is arranged on a coolant supply unit.

In the figures, 10 denotes overall a dental-medical fan, with which a gaseous working fluid can be taken in or compressed. The fan 10 is used in particular as a suction unit for one or
more dental places of treatment.

For the sake of overall clarity, not all components and elements are provided with reference signs in each figure.

The fan 10 comprises a compressor unit 12 and in the case of the present exemplary embodiment a coolant supply unit 14, on which the compressor unit 12 is arranged. When there is a stationary coolant supply, the dental fan 10 may however also be operated without the coolant supply unit 14 and then only comprise the compressor unit 12. This and the coolant supply unit 14 will be discussed again further below.

The compressor unit 12 comprises a multipart housing 16 with an outer housing 18, which encloses an inner space 20. The inner space 20 is functionally divided into a compressor sector 22, a drive sector 24 and a discharge sector 26. The compressor sector 22 extends in the outer housing 18 from top to bottom, the drive sector 24 is formed in the outer housing 18 from top to bottom alongside the compressor sector 22 and up to the drive sector 24, which extends under the drive sector 24 and in part alongside the compressor sector 22. To put it another way, the discharge sector 26 is formed at a lower level than the drive sector 24 and, at the level of the discharge sector 26, the compressor sector 22 is partially surrounded by the discharge sector. The housing 16 comprises an inlet opening 28 and an outlet opening 30 for the working fluid, which are fluidically connected to one another. The working fluid is passed through the inlet opening 28 into the compressor sector 22, compressed there and passed on by way of a flow path through the discharge sector 26 and discharged by way of the outlet opening 30.

Arranged in the drive sector 18 is an electric motor 32, which for its part comprises a motor housing 34. The electric motor 32 is formed in a way known per se as an internal rotor motor and comprises a stator, which for the sake of overall clarity is not specifically shown, and a rotor denoted by 36, which forms a rotary shaft 38.

Figure 2:
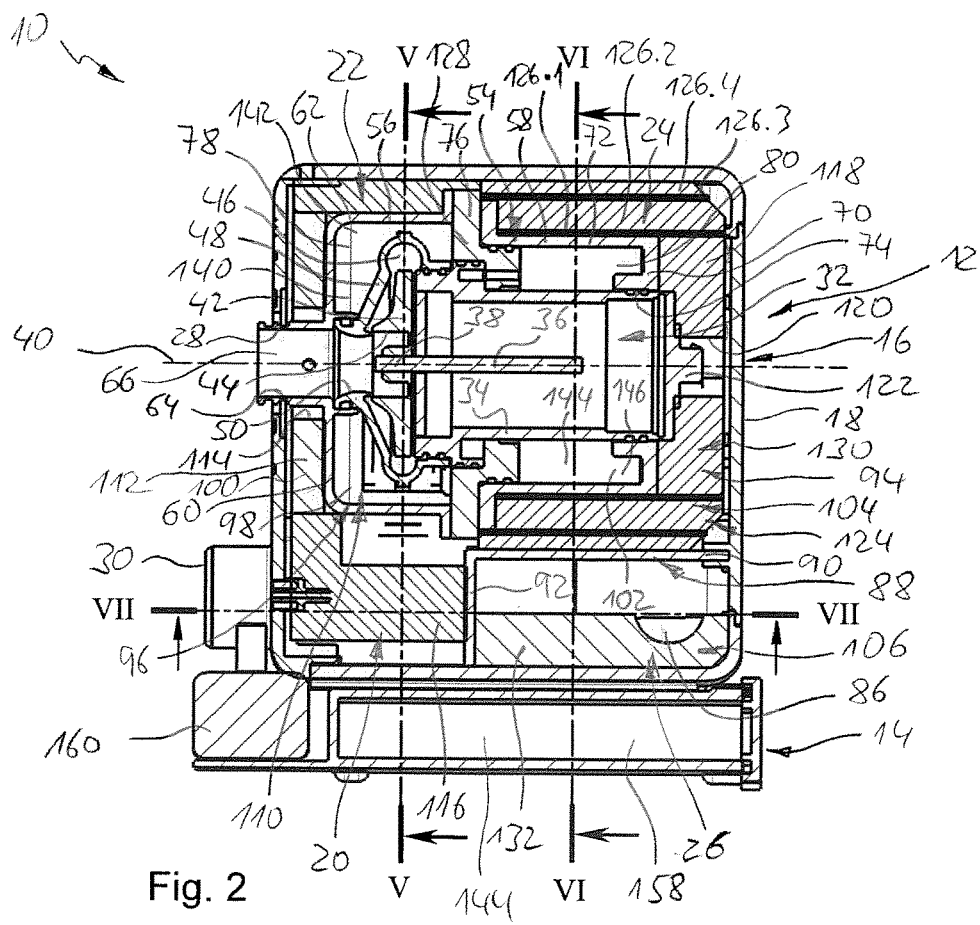
FIG. 2 shows a section of the compressor unit and the coolant supply unit in the sectional plane II-II in FIG. 1.

In the case of the present exemplary embodiment, the rotor 36 and the rotary shaft 38 run coaxially in relation to a longitudinal axis 40 of the compressor unit 12, which is only shown in FIG. 2. With respect to this longitudinal axis 40, the inlet opening 28 of the outer housing 18 is arranged on an end face of the compressor unit 12.

The electric motor 32 is a high-speed electric motor and is operated at rotational speeds of 40 000 rpm to 55 000 rpm and generally at a rotational speed of approximately 50 000 rpm. In practice, the electric motor 32 is preferably an electronically commutated DC motor.

In the case of a modification that is not explicitly shown, the electric motor 32 may also be designed as an external rotor, whereby a greater torque can be obtained. Faster starting of the electric motor 32 from a standstill is however assisted by an internal rotor motor.

The rotor shaft 38 extends out of the motor housing 34 into the compressor sector 22 of the inner space 20 and bears there, for conjoint rotation, a radial impeller 42, which has in a known way a cover plate, which is not separately denoted, and on its side remote from the rotary shaft 38 a central input opening 44. The input opening 44 is formed coaxially in relation to the rotary shaft 38. The explained longitudinal axis 40 of the compressor unit 12 is defined by the axis of rotation of the radial impeller 42, which consequently likewise establishes an axial direction of the compressor unit 12.

Figure 3:
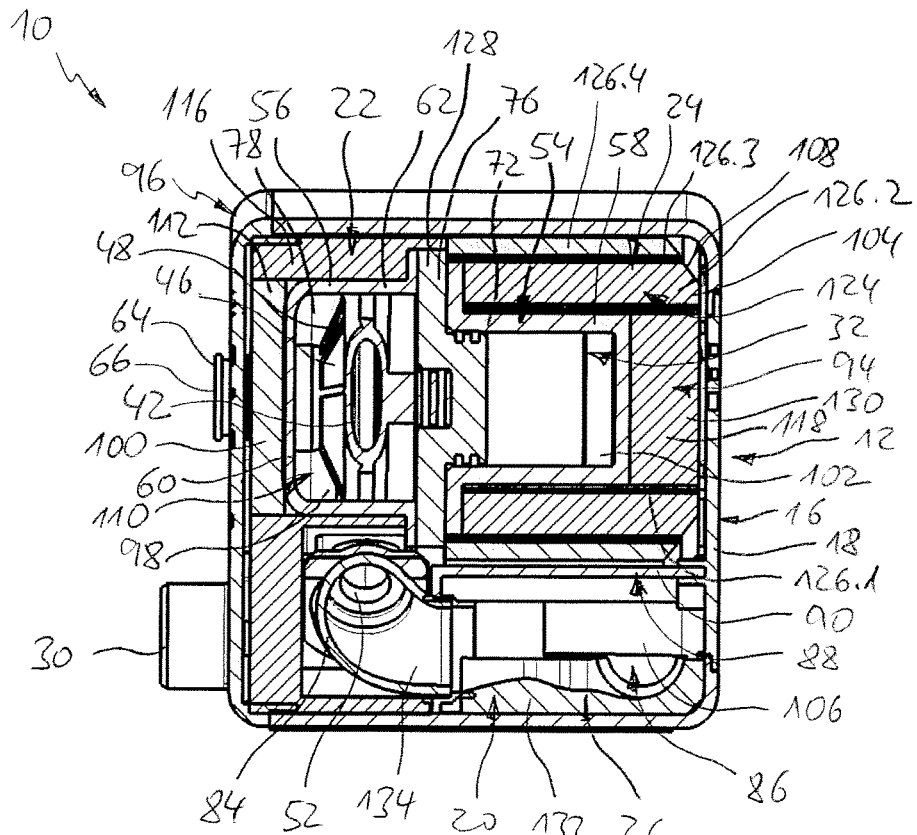
FIG. 3 shows a section of the compressor unit in the sectional plane III-III in FIG. 1.
Figure 4:
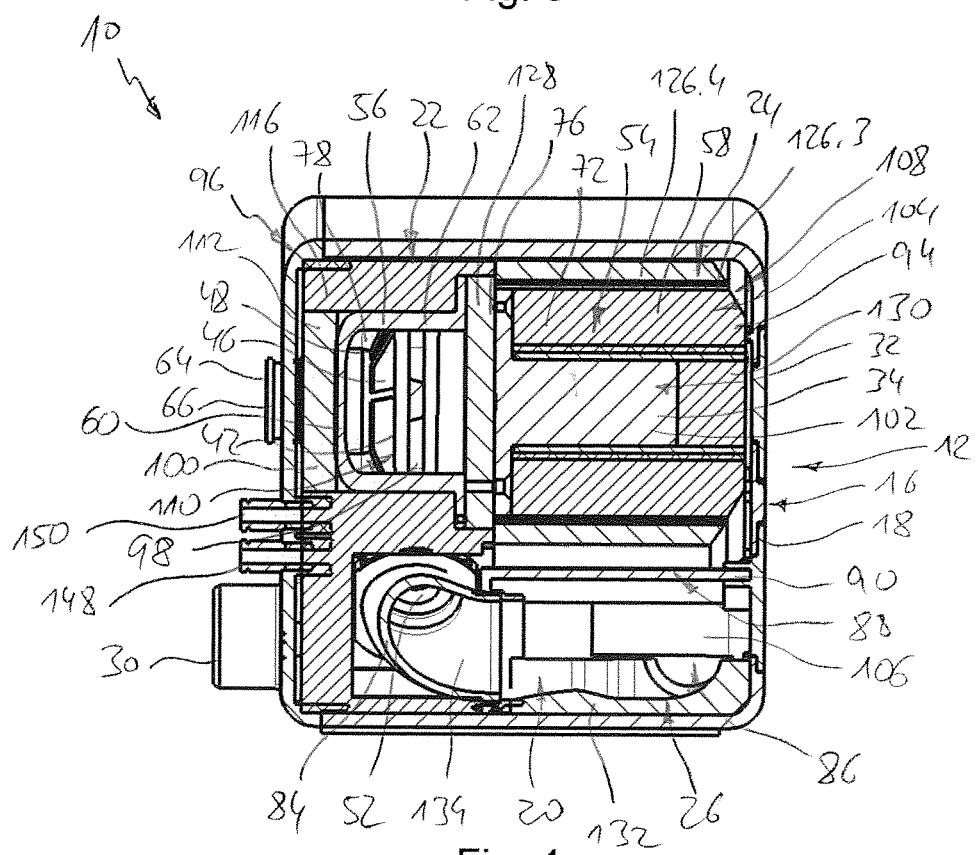
FIG. 4 shows a section of the compressor unit in the sectional plane IV-IV in FIG. 1.

The radial impeller 42 is kept in a spiral space 46 of a spiral housing 48, which has a flow inlet 50, which leads to the input opening 44 of the radial impeller 42. A flow output 52 of the spiral housing 48, which can be seen in FIGS. 3 to 5, leads the compressed working fluid downward into the discharge sector 26.

The radial impeller 42 and the spiral housing 48 together form a fan unit 42, 48.

The spiral housing 48 and the motor housing 34 are arranged in a multipart casing 54 of plastic, which has a first encasing portion 56, which surrounds the spiral housing 48, and has a second encasing portion 58, which surrounds the motor housing 34.

The first encasing portion 56 of the casing 50 has a free end wall 60, which faces in the direction of the inlet opening 28 of the outer housing 18, and a lateral wall 62. The end wall 60 comprises an inlet 64, through which working fluid can flow to the input opening 44 of the radial impeller 42. In the case of the present exemplary embodiment, the inlet 64 of the casing 50 is formed as an inlet nozzle 66, which extends coaxially outward through the inlet opening 28 of the outer housing 18 and is externally accessible there as a connection for an intake line 68. The intake line 68 is only shown in FIG. 9.

The second encasing portion 58 has a free end wall 70, remote from the spiral housing 48, and a lateral wall 72. Formed in the end wall 70, coaxially in relation to the longitudinal axis 40, is a bearing passage 74, which surrounds the motor housing 34 in an end portion near the end wall 70 and is sealed with respect to the motor housing 34.

Between the first encasing portion 56 and the second encasing portion 58 of the casing 54, an intermediate wall 76 is formed in such a way that on the one hand the spiral housing 48, and consequently the fan unit 42, 48, is surrounded by a radial space 78, which directly adjoins the fan unit 42, 48, and that on the other hand the motor housing 34, and consequently the electric motor 32, are surrounded by an annular space 80, which can only be seen FIG. 2 and directly adjoins the electric motor 32.

Figure 5:
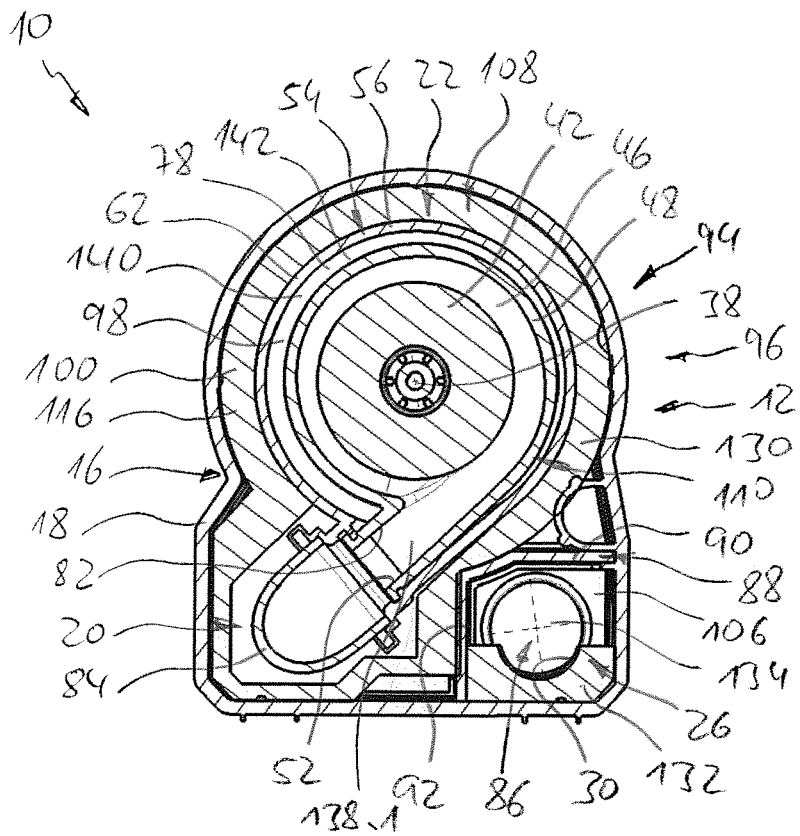
FIG. 5 shows a section of the compressor unit along the sectional line V-V in FIG. 2.

As can be seen in FIG. 5, the flow outlet 52 of the spiral housing 48 that is referred to above comprises a connecting channel 82, which leads from the spiral space 46 to a deflecting channel 84, by means of which the compressed working fluid is deflected by 90° and led into a discharge channel 86, which leads through the discharge sector 26 to the outlet opening 30 of the compressor unit 12. In general terms, the discharge channel 86 is therefore connected to the flow outlet 52 of the fan unit 42, 48.

A housing insert 88 separates the discharge sector 26 structurally from the compressor sector 22 and the drive sector 24. As can be seen from FIGS. 6 and 7, the housing insert 88 defines an intermediate base 90, which is provided above the discharge channel 86, and intermediate walls 92, which separate the compressor sector 22 from the discharge sector 26 in the region in which the deflecting channel 84 is arranged in the compressor sector 22. The intermediate base 90 and the intermediate walls 92 may also be integrated in one piece.

The compressor unit 12 comprises a soundproofing absorption system 94 and a cooling system 96, the elements of which partially contribute both to the soundproofing and to the cooling of the compressor unit 12.

First the elements and components with respect to the absorption system 94 and the soundproofing of the compressor unit 12 are discussed and then the elements and components with respect to the cooling system 96 and the cooling of the compressor unit 12.

The soundproofing absorption system 94 defines altogether five absorption spaces for the soundproofing, a first, inner compressor absorption space 98, a second, outer compressor absorption space 100, a first, inner drive absorption space 102, a second, outer drive absorption space 104 and a discharge absorption space 106.

The first and second compressor absorption spaces 98, 100 at least partially surround the fan unit 42, 48 in the radial direction. The first and second drive absorption spaces 102, 104 at least partially surround the electric motor 32 in the radial direction.

The first compressor absorption space 98 is formed by the radial space 78 described above and the first drive absorption space 102 is formed by the annular space 80 described above.

The second compressor absorption space 100 is defined by the space between the outer housing 18 and the first encasing portion 56 of the casing 54 and also the intermediate walls 92 of the housing insert 88. The second drive absorption space 104 is formed by the space between the outer housing 18 and the second encasing portion 58 of the casing 54 and also the intermediate base 90 of the housing insert 88.

The discharge absorption space 106 is formed by the space between the outer housing 18, the intermediate base 90 and the intermediate walls 92 of the housing insert 88.

The soundproofing absorption system 94 comprises a solid system 108 on the one hand and a fluid system 110 on the other hand.

The solid system 108 comprises a first solid absorbing block 112 of sound-absorbing material, which is arranged in the second compressor absorption space 100 between the outer housing 18 and the casing 54 in the axial direction with respect to the longitudinal axis 40 and has a passage 114, through which the inlet nozzle 66 of the first encasing portion 56 extends. When mention is made here and hereinafter generally of sound-absorbing material, including in connection with other elements and components, this should be understood as meaning a material that has sound-absorbing properties that are suitable for the frequency ranges concerned here.

In case of the present exemplary embodiment, the absorbing block 112 is produced from a foam material. When mention is made here and hereinafter of a foam material, including in connection with other elements and components, this is in practice a recycled foam, as is known per se. However, any other foam material that has sound-absorbing properties suitable for the frequency ranges concerned here may be respectively used.

Arranged in the remaining region of the second compressor absorption space 100 is a solid absorber 116 of sound-absorbing material, which is adapted to complement the space available. The absorber 116 is likewise formed from a foam material. As FIG. 5 shows, the absorber 116 in this case does not lie against the deflecting channel 84 that it encloses, whereas the absorber 116 is in contact with the casing 54.

In the case of a modification that is not specifically shown, the first absorbing block 112 and the absorber 116 may not be separate elements, but portions of a contiguous absorbing structure 112, 116.

The solid system also comprises in the second drive absorption space 104 a second solid absorbing block 118 of sound-absorbing material which, in the axial direction with respect to the longitudinal axis 40, is arranged between the outer housing 18 and the casing 54 and has a recess 120, in which the motor housing 34 is supported. The motor housing 34 has for this an end-face bearing projection 122, which protrudes into the recess 120 of the second material block 118. The second absorbing block 118 is likewise produced from a foam material.

In the remaining, annular region of the second compressor absorption space 100, which is present radially around the second encasing portion 58 of the casing 54 and the absorbing block 118, there is formed a solid absorbing layer 124 of sound-absorbing material. This absorbing layer 124 is for its part formed from a number of layers 126 following one another in the radial direction, with four layers 126.1, 126.2, 126.3 and 126.4 in the radially outward direction being shown in the case of the present exemplary embodiment. The first layer 126.1 and the third layer 126.3 are in this case formed from a bitumen heavy foil and have a thickness of approximately 1 mm to 2 mm, preferably of 1.5 mm. The second layer 126.2 is again of foam material and has a thickness of 8 mm to 12 mm, preferably of 10 mm. The fourth layer 126.4 is likewise again produced from foam material and has a thickness of 3 mm to 7 mm, preferably of 5 mm.

The layers 126 may be separate from one another or be formed entirely or partially as a composite layer in which the layers 126 are adhesively bonded to one another.

In the case of a modification that is not specifically shown, the absorbing block 112 and/or the absorber 116 in the second compressor absorption space 100 and/or also the second absorbing block 118 in the second drive absorption space 104 may in this way be formed from suitable layers and/or the absorbing layer 124 may be formed in one piece from one and the same absorbing material, such as for example a recycled foam.

In the case of a modification that is not specifically shown, the second absorbing block 118 and the absorbing layer 124 may not be separate elements, but portions of a contiguous absorbing structure 118, 124.

In order in addition to the soundproofing to reduce fundamentally any transmission of structure-borne sound from the electric motor 32 and the spiral housing 48 to the outer housing 18, the electric motor 32 and the spiral housing 48 are mounted in a floating manner. This is achieved in the case of the exemplary embodiment shown here by the motor housing 34 being mounted in a floating manner by the second absorbing block 118 and also the casing 54 being mounted in a floating manner. Its intermediate wall 76 serves in this case not only as a separating wall between the radial space 78 and the annular space 80, but additionally as a bearing flange 128, by which the motor housing 34 is radially mounted in the casing 54.

In the case of the present exemplary embodiment, the soundproofing absorption system 94 consequently comprises a bearing structure 130, by means of which the electric motor 32 and the spiral housing 48 are mounted in a floating manner with respect to the outer housing 18.

In the case of the present exemplary embodiment, this floating mounting is formed by the solid-material elements 112, 116, 118 and 124, i.e. by the first absorbing block 112, the absorber 116, the second absorbing block 118 and the absorbing layer 124 at the same time a bearing structure 130. The bearing structure may also comprise only one or some of the solid-material elements 112, 116, 118, 124 mentioned.

The solid system 110 of the soundproofing absorption system 94 also comprises a solid sound damper volume 132 of sound-absorbing material, which surrounds the discharge channel 86 and fills the discharge absorption space 106. In each of FIGS. 2 to 6, an upper part of the sound damper volume 132 has been omitted, and is not represented, in order to show how it looks inside the discharge sector 24 and the discharge absorption space 106. In the case of the present exemplary embodiment, the sound-absorbing material of the sound damper volume 132 is likewise a foam material.

Figure 6:
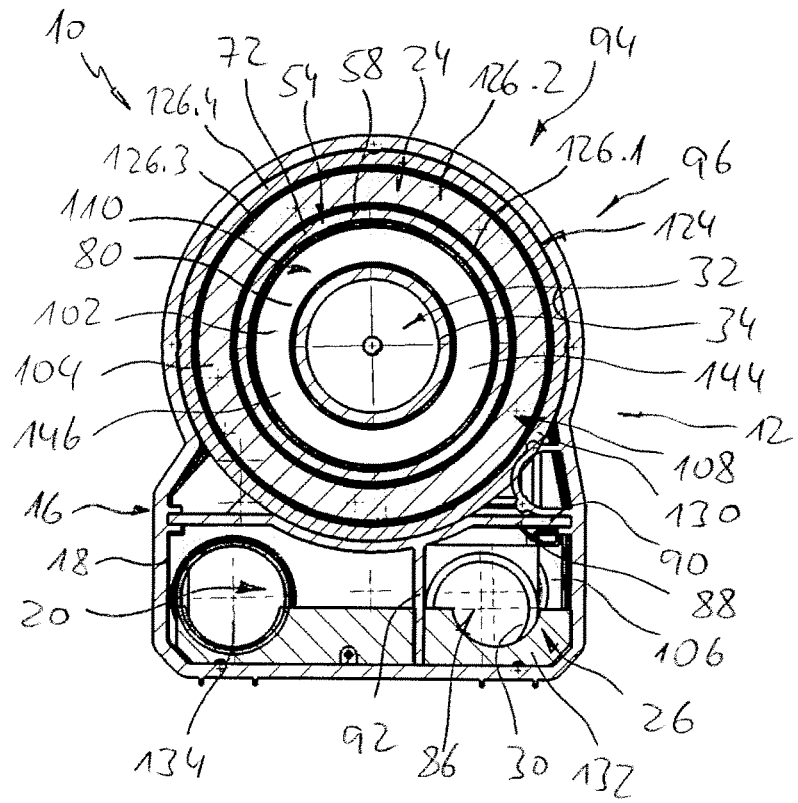
FIG. 6 shows a section of the compressor unit along the sectional line VI-VI in FIG. 2.
Figure 7:
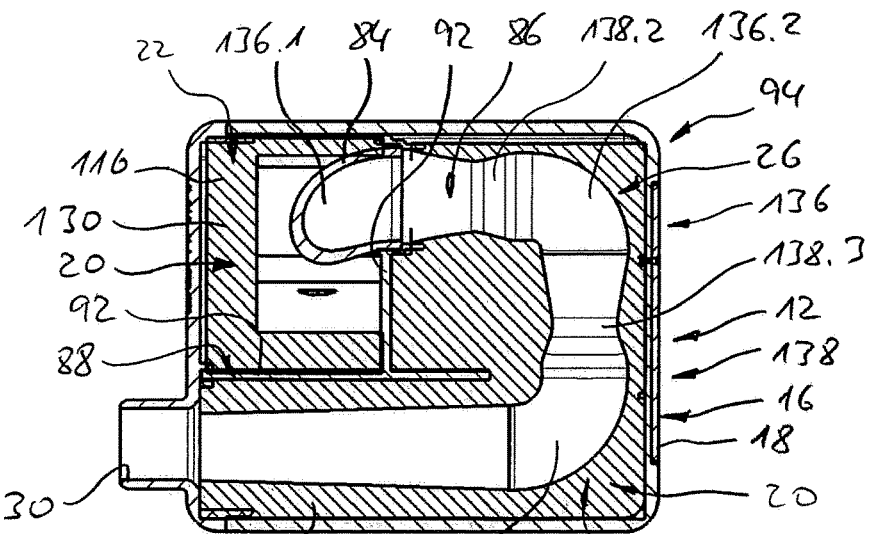
FIG. 7 shows a section of the compressor unit along the sectional line VII-VII in FIG. 2.

Furthermore, structural measures additionally contribute to the sound damping of the exhaust air, concerning the flow path denoted by 134 for the exhaust air from the spiral housing 48 to the outlet opening 30 of the compressor unit 12, which is described on the basis of FIGS. 5, 6 and 7. This flow path 134 is formed altogether by the connecting channel 82, the deflecting channel 84 and the discharge channel 86.

The flow path 134 comprises a number of deflecting portions 136, in which the direction of flow of the exhaust air is deflected, in order to provide as long a flow path as possible for the exhaust air within the available installation space of the discharge sector 24. In the case of the present exemplary embodiment, there are three such deflecting portions 136. A first deflecting portion 136.1 is formed by the already described deflecting channel 84, which is followed in the direction of flow by two further deflecting portions 136.2 and 136.3. In the case of the present exemplary embodiment, the exhaust air is deflected in each deflecting portion 136 by 90°.

With a deflection of a gas flow by an angle of 90°, there is a relatively great pressure loss. Although the pressure loss with a deflection by a smaller angle is more moderate, the available installation space requires greater defections in the discharge channel 86 in order to provide the flow path 134 in the discharge sector 26. There are therefore pressure compensating portions 138 with a constriction in the flow path 134. For this, the pressure compensating portions 138 define in the direction of flow a narrowing or narrowing cross section and then again a widening cross section, with each deflecting portion 136.1, 136.2 and 136.3 being preceded in the direction of flow by a corresponding pressure compensating portion 138.1, 138.2 and 138.3, respectively.

The first pressure compensating portion 138.1 is only denoted in FIG. 5 and is in this case provided by the connecting channel 82 between the spiral space 46 and the deflecting channel 86 having a smaller cross section than the deflecting channel 86, and consequently being narrowed in comparison with it, the flow path 134 abruptly widening thereafter to the deflecting channel 86 by way of a step; this is illustrated in particular by FIG. 5. The cross section is in this case widened by a factor of approximately 1.3 to 1.95, preferably by a factor of approximately 1.3.

As can be seen in FIG. 7, the cross sections of the discharge channel 86 in the other pressure compensating portions 138.2 and 138.3 respectively narrow conically and then widen, again conically, to the respective deflecting portion 136.2, 136.3. The factor between the cross sections of the constrictions of the pressure compensating portions 138 and the cross sections of the discharge channel 86 directly before and after the pressure compensating portions 138 is approximately 1.24. In the case of modifications that are not specifically shown, the factor lies between 1.1 and 1.3 and in the case of a variant that is again preferred there is approximately 1.3.

The aforementioned fluid system 110 of the soundproofing absorption system 94 comprises a first liquid volume 140 of a first liquid 142 in the first compressor absorption space 98 and a second liquid volume 144 of a second liquid 146 in the first drive absorption space 102, wherein these absorption spaces 98 and 102 are formed, as mentioned above, by the radial space 78 and by the annular space 80, respectively.

By a combination of the solid system 108 and the fluid system 110 for the soundproofing, effective soundproofing is achieved, and for this adaptation to the frequency range of the sound that is emitted in particular by the radial impeller 42 and the electric motor 32.

With respect to the spiral housing 48, in the radially outward direction altogether four layers that contribute to the soundproofing are formed in the case of the present exemplary embodiment, to be specific the first liquid 140, the first encasing portion 56 of the casing 54, the absorber 116 and the outer housing 18. These four layers may in this case be provided with a total thickness in the radial direction of less than 20 mm.

With respect to the electric motor 32, the layers 126 already provide various layers with different sound-absorbing properties, whereby an effective adaptation to the frequency range of the electric motor 32 of which the sound emission is to be absorbed can be achieved. Starting from the motor housing 34, in this way altogether seven layers that contribute to the soundproofing are formed in the case of the present exemplary embodiment, to be specific in the radially outward direction the second liquid 146, the second encasing portion 58 of the casing 54, the four layers 126.1, 126.2, 126.3 and 126.4 and the outer housing 18. These seven layers may in this case be provided with a total thickness in the radial direction of less than 40 mm.

In addition to their soundproofing function, the liquids 140 and 146 also serve as a heat conductor or as a cooling liquid or as a heat conductor of the aforementioned cooling system 96, with which the heat produced during the operation of the compressor unit by the electric motor 32 and by the fan unit 42, 48, i.e. the radial impeller 42 in the spiral housing 48, can be removed as waste heat.

The liquids 140, 146 may be water, but also liquids with a comparatively high viscosity and with a thermal conductivity sufficient for the removal of heat. Silicones, oils, glycols, glycol mixtures and the like for example come into consideration for this.

In case of the present exemplary embodiment, the first liquid 140 in the first compressor absorption space 98 is such a material with a higher viscosity, whereas the second liquid 146 in the first drive absorption space 102 is water.

Figure 10:
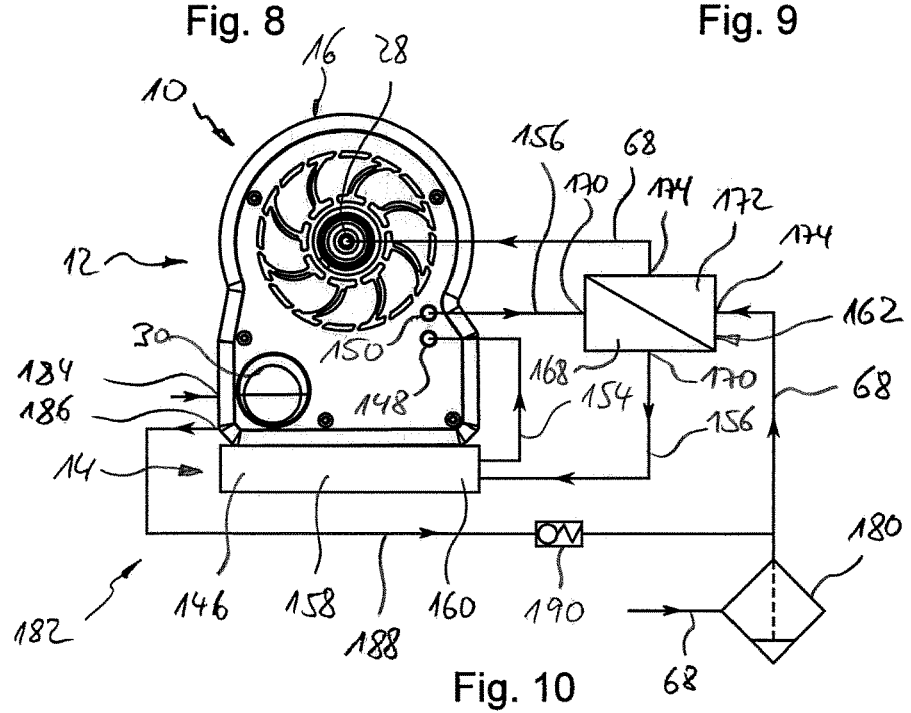
FIG. 10 shows a layout of the fan with an additional safety device.

For the cooling system 96, the first compressor absorption space 98 is formed as a closed space, whereas the first drive absorption space 102 is designed as a through-flow space, which is connected by way of inner flow channels that are not specifically shown, and are separately routed, to an inflow connection 148 and an outflow connection 150 of the compressor unit 12, so that a cooling circuit 152 can be formed. The connections 148 and 150 may in particular be connected by way of an inflow line 154 and an outflow line 156, respectively, which are shown in FIG. 10, to the coolant supply unit 14 mentioned at the beginning.

The coolant supply unit 14 comprises a coolant container 158 for the second liquid 146, which here is consequently cooling water, and a pump 160, preferably a centrifugal pump, so that the liquid 146 can be circulated through the first drive absorption space 102. However, the function of the liquid 146 also as a soundproofing means remains unaffected by this. The first liquid 140 also accomplishes its soundproofing effect irrespective of its property as a heat conductor.

In order that the heat of the radial impeller 42 and the spiral housing 48 that is taken up by the first liquid 140 in the first compressor absorption space 98 can be removed effectively, the radial space 78 and the annular space 80 are arranged in the way described next to one another in the axial direction, separated by the intermediate wall 76. Furthermore, the intermediate wall 76 of the casing 54 is formed as a heat conductor and produced from a material with good heat conduction, with aluminum being used in the case of the present exemplary embodiment.

In this way, the waste heat of the fan unit 42, 48 is transferred to the first liquid 140, from the latter to the intermediate wall 76 and on to the second liquid 146, i.e. in the present case to the cooling water in the cooling circuit 152, and is finally removed from the latter.

The waste heat of the electric motor 32 is transferred by way of the motor housing 34 directly to the liquid 146, i.e. to the cooling water in the cooling circuit 152, and is removed from the latter.

In case of a modification that is not specifically shown, the first drive absorption space 102 is formed as a closed space and the first compressor absorption space 98 is formed as a through-flow space. What has been said above with respect to the first drive absorption space 102 and the first compressor absorption space 98 conversely applies in this case correspondingly analogously. In this case, the first liquid 142 therefore serves as a cooling liquid in the cooling circuit 152. In the case of a further modification that is not specifically shown, both the first drive absorption space 102 and the first compressor absorption space 98 may be designed as a through-flow space, so that both spaces are part of the cooling circuit 152. Here, the two spaces 102 and 98 may possibly be fluidically connected to one another. In this case, therefore, the liquids 142 and 146 are one and the same liquid, which serves on the one hand as a cooling liquid and on the other hand as a soundproofing means.

Figures 8, 9:
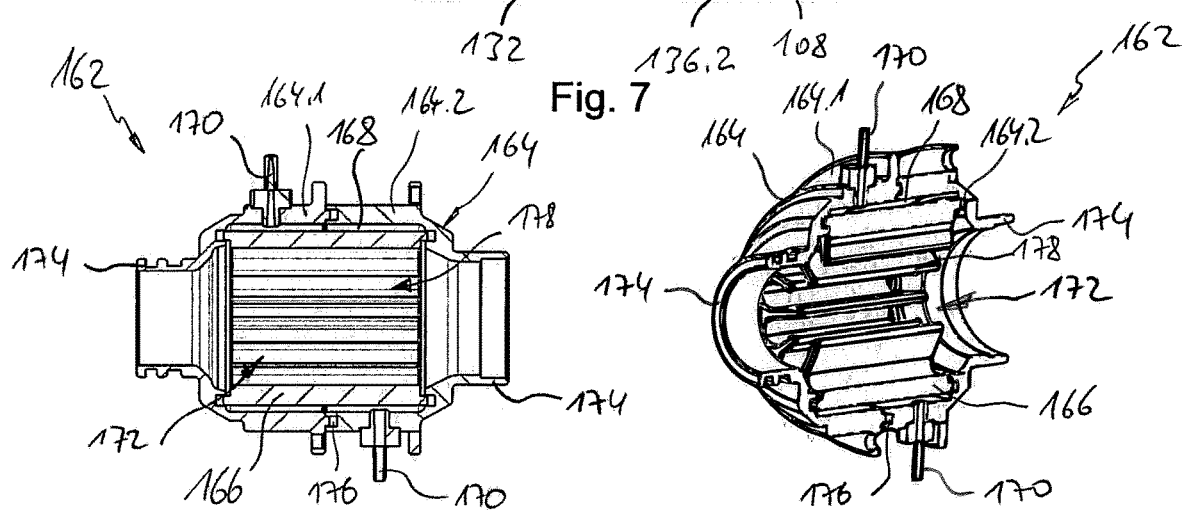
FIG. 8 shows a longitudinal section of a heat exchanger for the air feed line of the compressor unit.
FIG. 9 shows a perspective view of the heat exchanger in section according to FIG. 8.

The cooling system 96 also comprises a heat exchanger 162, which is shown in detail in FIGS. 8 and 9, is arranged in the intake line 68 and is flowed through by the working fluid, which in turn is illustrated in FIG. 10. The heat exchanger 162 is produced as an extruded profile, preferably from aluminum, and comprises an outer shell 164 and an inner shell 166, between which an annular space 168 is formed. The outer shell 164 has two fluid connections 170, opening out into the annular space 168, so that the annular space 168 can be flowed through by a fluid.

The inner shell 166 delimits radially inwardly an axial through-flow space 172, which extends in the axial direction between two line connections 174, in relation to which the outer shell 164 is formed. Protruding radially inward from the inner shell 166 are longitudinal ribs 176, which extend in the axial direction and by which the contact surface for the fluid that flows through the through-flow space 172 is increased.

The outer shell 164 is formed from two fastened-together parts 164.1 and 164.2, which are connected to one another in a fluid-tight manner by way of an O-ring seal 176, each part 164.1, 164.2 respectively defining a fluid connection 170. The inner shell 166 with the longitudinal ribs 176 is formed as a separate insertion piece, which lies in a fluid-tight manner against the end face of the outer shell 164.

As FIG. 10 illustrates, the heat exchanger 162 is integrated by way of its line connections 174 in the intake line 68 of the compressor unit 12 in such a way that the working fluid, in the present case therefore the intake air, is passed through the through-flow space 172 of the heat exchanger 162. The heat exchanger 162 is integrated by way of its fluid connections 170, which lead to the annular space 168, in the outflow line 156.

In this way, the intake air that is taken in by the intake line 68 of the compressor unit 12 is used for cooling the cooling liquid 146, which leaves the compressor unit 12 in a heated state. Although as a result the intake air is heated before it enters the compressor unit 12, and as a result the components and elements in its vicinity that are flowed through by the intake air are heated to a greater extent than without being preceded by the heat exchanger 162, the internal cooling of the compressor unit 12 by means of the cooling liquid 146 means that sufficient cooling can nevertheless be brought about.

This concept allows in particular the fan 10 illustrated here with the compressor unit 12 and the coolant supply unit 14 to be provided as an autonomous stand-alone unit. In this case, the liquid 146 may contain a proportion of antifreeze, so that the liquid 146 cannot freeze during the storage and/or transport of the fan 10.

It should be emphasized at this point that this concept is not restricted to the specific exemplary embodiment of the heat exchanger 162 described here, but can be realized with any gas/liquid heat exchanger that meets the desired and required specifications.

In addition, the liquid 146 may also not be supplied by the coolant supply unit 14 accompanying the fan 10, but by the water made available by a dental treatment chair.

The rinsing water of a rinsing unit in the treatment chair, which may be passed through the compressor unit before it flows into the rinsing unit at the treatment chair, may be used in particular in this case. The plastic components of the compressor unit that are flowed through or over by the rinsing water may be officially approved for contact with drinking water and correspondingly be suitable for drinking water.

During the operation of a dental fan, it may happen that the fan is improperly operated in such a way that the compressor unit 12 is activated but the intake line 68 is closed. In the case of a dental application, the intake line 68 is for example connected to a suction cannula, wherein, upstream of the heat exchanger 162, the intake air is then first passed through a liquid/particle separator known per se, which is illustrated in FIG. 10 and is denoted by 180.

A suction cannula may for example be blocked by foreign bodies, so that intake air no longer reaches the compressor unit 12. Since, however, the intake air flowing through the compressor unit 12 also contributes to the cooling of the components and elements, and in particular takes up heat at the radial impeller 42 and the rotary shaft 38, the cooling liquid 146 alone can no longer bring about sufficient cooling.

Therefore, the fan 10 comprises a safety device 182, by which an auxiliary gas can be fed to the inlet opening 28 of the compressor unit 12 as a through-flow gas. For this purpose, the discharge channel 86 of the compressor unit 12 is connected by way of an auxiliary gas inlet 184 to the surroundings and by way of an auxiliary gas outlet 186 and an auxiliary gas line 188 connected thereto, upstream of the heat exchanger 162, to the intake line 68. Any gas that flows through the auxiliary gas inlet 184 into the discharge channel 86 and out again through the auxiliary gas outlet 186 is understood here as an auxiliary gas. In practice, the auxiliary gas is provided by the ambient air; however, a separate auxiliary gas reservoir may also be provided.

Arranged in the auxiliary gas line 188 is a valve 190, which blocks the flow path in the direction of the intake line 68 if there are there operating parameters such as occur during normal operation, if the intake path is free and intake air flows through the intake line 68 to the compressor unit 12. A valve which closes if in the discharge channel 86 there are no deviations from conditions that occur during normal operation may possibly also be provided in or at the auxiliary gas inlet 184.

For example, the valve 190 may be pressure-dependent. So if the intake line 68 upstream of the auxiliary gas line 188 is blocked, a negative pressure is produced in the intake line 68 if the compressor unit 12 continues to operate, until finally the valve 190 opens. The negative pressure prevailing then causes auxiliary gas, i.e. in the present case ambient air, to be taken in through the auxiliary gas inlet 184 and passed on through the discharge channel 86 and by way of the auxiliary gas outlet 186 and the auxiliary gas line 188 into the intake line 68. This auxiliary gas then flows through the compressor unit 12, whereby the through-flow necessary for sufficient cooling of the compressor unit 12 is restored.

A pressure-dependent valve may be provided by any valve that can be controlled in a manner dependent on a pressure value. Instead of the pressure, the volumetric flow in the intake line 68 may also be monitored. If it goes below a predetermined threshold value, the valve 190, which is then dependent on the volumetric flow, opens. As a further alternative, the temperature of the cooling liquid 146 may also be used as a control parameter and the valve 190 opens if the cooling liquid 146 becomes too warm, since flow fluid is no longer passed through the heat exchanger 162.

In particular because of the soundproofing absorption system 94 with the combination of soundproofing by the solid system 108 and the fluid system 110, it is possible that, in spite of the high-speed electric motor 32, the compressor unit 12 only produces a moderate level of noise during operation. It has been found in practice that, with a rotational speed of the electric motor 32 of 50 000 rpm, a level of 45 dB(A) can be achieved.

With a speed of 50 000 rpm, a suction capacity of 300 l min$^{-1}$ at 140 mbar can be achieved.

Significantly reduced dimensions can in this case be achieved in relation to compressors with comparable suction capacity that are known on the market. The compressor unit 12 has dimensions with a length in the axial direction of the longitudinal axis 40 of 160 mm to 210 mm, a width of 100 mm to 150 mm and a height of 135 mm to 185 mm. The exemplary embodiment described here has the dimensions 185 mm (L)×124 mm (B)×159 mm (H).

These compact dimensions are additionally possible because of the cooling system 96, and in this case because of the combination of the fluid system 110 for soundproofing and the cooling system 96, while the cooling capacity is also effectively assisted by the additional heat exchanger 162 in the intake line.

The invention claimed is:

1. Medical fan for extracting or compressing a gaseous working fluid, comprising:
    a) a compressor unit with an outer housing, which comprises an inlet opening for the working fluid and an outlet opening for the working fluid, which are fluidically connected to one another, and which defines a compressor sector and a drive sector;
    b) a fan unit with a radial impeller in a spiral housing, which is kept in the compressor sector and by which working fluid can be fed from the inlet opening to the outlet opening, wherein the axis of rotation of the radial impeller defines the longitudinal axis and an axial direction of the compressor unit, wherein the fan unit comprises a cooling system, for which
    a) a first drive absorption space is formed as a through-flow space and a first compressor absorption space is formed as a closed space; or
    the first drive absorption space is formed as a closed space and the first compressor absorption space is formed as a through-flow space; or
    the first drive absorption space and the first compressor absorption space are formed as a through-flow space;
    b) the through-flow space is connected to an inflow connection and an outflow connection, which for their part are connected to an inflow line and an outflow line to a cooling circuit, in which the liquid flowing through the through-flow space provides a cooling liquid, wherein the inlet opening is connected to an intake line and in that the cooling system comprises a heat exchanger which is connected to the intake line and the outflow line of the cooling circuit in such a way that the heat exchanger is flowed through by the working fluid and the cooling liquid in such a way that heat is transferred from the cooling liquid to the working fluid and the cooling liquid is cooled;
    c) an electric motor which is kept in the drive sector and by which the radial impeller can be driven;
    d) a soundproofing absorption system;
wherein:
    e) the soundproofing absorption system in the compressor sector defines a first and a second compressor absorption space, which at least partially surround the spiral housing in the radial direction, wherein, in the radial direction, in the first compressor absorption space there is a first liquid volume of a first liquid and in the second compressor absorption space there is a solid absorber;

f) the soundproofing absorption system in the drive sector defines a first and a second drive absorption space, which at least partially surround the electric motor in the radial direction, wherein, in the radial direction, in the first drive absorption space there is a second liquid volume of a second liquid and in the second drive absorption space there is a solid absorbing layer.

2. Fan according to claim 1, wherein:
a) the first compressor absorption space is a radial space that directly adjoins the spiral housing; and/or
b) the first drive absorption space is an annular space that directly adjoins the electric motor.

3. Fan according to claim 1, wherein the first liquid and/or the second liquid is water, a silicone, an oil, a glycol or a glycol mixture.

4. Fan according to claim 1, wherein the absorber and/or the absorbing layer is at least partially formed from a foam material.

5. Fan according to claim 1, wherein the absorber and/or the absorbing layer is formed from a number of layers following one another in the radial direction that are separate from one another or are formed entirely or partially as a composite layer in which the layers are bonded to one another;
wherein
a) at least one layer is produced from a foam material and at least one layer is produced from a bitumen heavy foil; and/or
b) layers following one another in the radial direction, which are alternately formed from a foam material and a bitumen heavy foil, are provided; and/or
c) four layers following one another in the radial direction are provided; and/or
d) the radially innermost layer is formed from a bitumen heavy foil.

6. Fan according to claim 1, wherein the soundproofing system also
a) comprises in the second compressor absorption space a solid absorbing block which, in the axial direction, is arranged between the first compressor absorption space and the outer housing; and/or
b) comprises in the second drive absorption space a solid absorbing block which, in the axial direction, is arranged between the first drive absorption space and the outer housing.

7. Fan according to claim 1, wherein:
a) the outer housing also defines a discharge sector, arranged in which is a discharge channel, which is connected to a flow output of the spiral housing and leads to the outlet opening of the compressor unit;
b) the soundproofing absorption system in the discharge sector defines a discharge absorption space, which at least partially surrounds the discharge channel and in which there a solid sound damper volume.

8. Fan according to claim 7, wherein a flow path for the working fluid is formed from the spiral housing to the outlet opening of the compressor unit, wherein this flow path comprises one or more deflecting points at which the direction of flow of exhaust air is deflected.

9. Fan according to claim 8, wherein there is at least before a deflecting point in the direction of flow a pressure compensating portion with a constriction, which defines in the direction of flow a narrowed or narrowing cross section and then again a widening cross section.

10. Fan according to claim 9, wherein the cross section of the flow path in a pressure compensating portion widens from the constriction to the re-widened cross section by a factor of between 1.1 and 1.3.

11. Fan according to claim 1, wherein the soundproofing absorption system comprises a bearing structure by means of which the electric motor and/or the spiral housing is mounted in a floating manner with respect to the outer housing.

12. Fan according to claim 11, wherein the bearing structure comprises the solid absorber and/or the solid absorbing layer and/or one or both of the solid absorbing blocks according to claim 6.

13. Fan according to claim 1, which comprises a coolant supply unit with a coolant container for the cooling liquid carried in the cooling circuit and a pump.

14. Fan according to claim 1, wherein the first compressor absorption space and the first drive absorption space are separated from one another by an intermediate wall, which is formed as a heat conductor.

15. Fan according to claim 1, wherein the inlet opening is connected to an intake line and a safety device is provided, by which partial or complete blocking of the intake line can be detected and, in the event of blocking of the intake line, provides an auxiliary gas, which flows to the inlet opening of the compressor unit instead of the working fluid.

16. Fan according to claim 15, characterized in that wherein the safety device comprises a valve in an auxiliary gas line, which opens out into the intake line, wherein the safety device is designed in such a way that the valve closes in a basic configuration and opens dependent on one or more parameters.

* * * * *